United States Patent
Kaifu et al.

(10) Patent No.: US 10,030,601 B2
(45) Date of Patent: Jul. 24, 2018

(54) FLOW RATE MEASURING DEVICE

(71) Applicant: DENSO CORPORATION, Kariya, Aichi-pref. (JP)

(72) Inventors: Teruaki Kaifu, Kariya (JP); Keisuke Itakura, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 15/264,648

(22) Filed: Sep. 14, 2016

(65) Prior Publication Data

US 2017/0074196 A1    Mar. 16, 2017

(30) Foreign Application Priority Data

Sep. 16, 2015    (JP) .................. 2015-182556

(51) Int. Cl.
*F02D 41/18*    (2006.01)
*F02M 35/10*    (2006.01)
*G01M 15/05*    (2006.01)

(52) U.S. Cl.
CPC ....... *F02D 41/18* (2013.01); *F02M 35/10386* (2013.01); *F02M 35/10393* (2013.01); *G01M 15/05* (2013.01); *F02D 2200/0418* (2013.01); *F02D 2400/18* (2013.01)

(58) Field of Classification Search
CPC .. G01F 1/684; F02D 41/18; F02D 2200/0418; F02D 2400/18; F02M 35/10393; F02M 35/10386; G01M 15/05
See application file for complete search history.

(56) References Cited

U.S. PATENT DOCUMENTS

| | | | |
|---|---|---|---|
| 8,549,901 B2* | 10/2013 | Saito | F02D 41/187 73/114.33 |
| 8,701,475 B2* | 4/2014 | Kohno | G01F 1/684 73/114.33 |
| 9,759,593 B2* | 9/2017 | Goka | G01F 5/00 |
| 2012/0198925 A1 | 8/2012 | Saito et al. | |
| 2013/0036806 A1 | 2/2013 | Kohno | |
| 2015/0260672 A1 | 9/2015 | Kaufmann et al. | |
| 2016/0290893 A1 | 10/2016 | Itakura et al. | |

FOREIGN PATENT DOCUMENTS

JP    5279667 B2    9/2013
JP    2015-87196 A    5/2015

* cited by examiner

*Primary Examiner* — Freddie Kirkland, III

(57) ABSTRACT

The present disclosure provides a flow rate measuring device including a flow rate detecting body, a humidity detecting body, and a base. The flow rate detecting body protrudes inside of an intake passage. The humidity detecting body protrudes inside of the intake passage at a position away from the flow rate detecting body. The base is connected to the flow rate detecting body and the humidity detecting body. The humidity detecting body holds a sensor chip that includes a humidity detecting element sensitive to the humidity of the intake air. A length, along a flow direction of the intake air, of an exposed portion of the humidity detecting body is defined as a referential length. The humidity detecting element exists within a range from an upstream end of the exposed portion of the humidity detecting body to a position of half the referential length.

2 Claims, 3 Drawing Sheets

FLOW RATE MEASURING DEVICE

CROSS REFERENCE TO RELATED APPLICATION

This application is based on reference Japanese Patent Application No. 2015-182556 filed on Sep. 16, 2015, the disclosure of which is incorporated herein by reference.

TECHNICAL FIELD

The present disclosure relates to a flow rate measuring device that measures a flow rate and a humidity of an intake air taken in an internal combustion engine.

BACKGROUND

Conventionally, there has been known a flow rate measuring device that is disposed in an intake passage through which an intake air flows. The flow rate measuring device includes a sensor chip (hereinafter, referred to as a "flow rate chip") that measures a flow rate of the intake air and a sensor chip (hereinafter, referred to as a "humidity chip") that measures a humidity of the intake air.

Such a flow rate measuring device includes a casing that holds the flow rate chip and the humidity chip and that protrudes inside of the intake passage. The humidity chip is held at a side wall of the casing (see, e.g., JP 2015-087196 A).

However, heat from the internal combustion engine is transferred to the humidity chip through the casing in the flow rate measuring device, and therefore a temperature of the humidity chip may increase. Thus, a temperature of a humidity detecting element, which is disposed on a surface of the humidity chip, may be also increased. As a result, the temperature of the humidity detecting element is different from an actual temperature of the intake air, which negatively effects on a detection value of the humidity of the intake air. For this reason, there is a need to prevent the heat transfer to the humidity chip from the casing.

For example, JP 5445535 B discloses an assembly to hold a humidity chip. The assembly is separately provided from the casing, and protrudes inside of the intake passage at a position away from the casing.

In such a flow rate measuring device, since the casing and the assembly are away from each other, heat transfer from the casing to the humidity chip is prohibited, and thus an increase in a temperature of the humidity chip can be suppressed. However, the assembly may transfer heat of the internal combustion engine to surrounding intake air, and as a result, a temperature of the intake air is increased, which may lead to an increase in a temperature of the humidity detecting element.

WO 2014/060161 A discloses a humidity chip covered by a cover.

In this measuring device, two small openings are defined in the cover to be arranged along a flow direction of an intake air. A small amount of an intake air is taken into the cover through the one opening at a downstream side, and then the intake air passes through the humidity chip. Eventually, the intake air is returned to the intake passage through the other opening at an upstream side.

Accordingly, the flow rate measuring device may provide function to prevent foreign material from flowing into the cover, thereby protecting the humidity chip from the foreign material. However, it is difficult for such a small amount of the intake air taken into the cover to sufficiently release heat.

Therefore, heat is easily accumulated in the flow rate measuring device, and thus it is difficult to suppress an increase in a temperature of the humidity chip.

In view of the above, it is an objective of the present disclosure to provide a flow rate measuring device disposed in an intake passage, wherein an increase in a temperature of a humidity detecting element having a humidity chip can be suppressed.

SUMMARY

An aspect of the present disclosure provides a flow rate measuring device including a flow rate detecting body, a humidity detecting body, and a base.

The flow rate detecting body protrudes inside of an intake passage through which an intake air to be taken in an internal combustion engine flows. The flow rate detecting body detects a flow rate of the intake air.

The humidity detecting body protrudes inside of the intake passage at a position away from the flow rate detecting body. The humidity detecting body detects a humidity of the intake air.

The base is connected to the flow rate detecting body and the humidity detecting body. The base serves as a root portion of the flow rate detecting body and the humidity detecting body.

The humidity detecting body holds a sensor chip that includes a humidity detecting element sensitive to the humidity of the intake air. The humidity detecting element is disposed on a surface of the sensor chip and the humidity detecting body holds the sensor chip such that the humidity detecting element is exposed inside of the intake passage.

A length, along a flow direction of the intake air, of an exposed portion of the humidity detecting body that is exposed inside of the intake passage is defined as a referential length.

The humidity detecting element exists within a range from an upstream end of the exposed portion of the humidity detecting body to a position of half the referential length.

Accordingly, the humidity detecting element is positioned upstream of a center point of the humidity detecting body in a flow direction of the intake air.

Thus, a heat amount transferred to an intake air reaching the humidity detecting element from the humidity detecting body can be small as compared to a case where the humidity detecting element is disposed downstream of the center point of the humidity detecting body.

As a result, an increase in a temperature of the intake air passing through the humidity detecting element can be suppressed.

Therefore, an increase in a temperature of the humidity detecting element of the humidity chip can be suppressed in the flow rate measuring device disposed in the intake passage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1A:
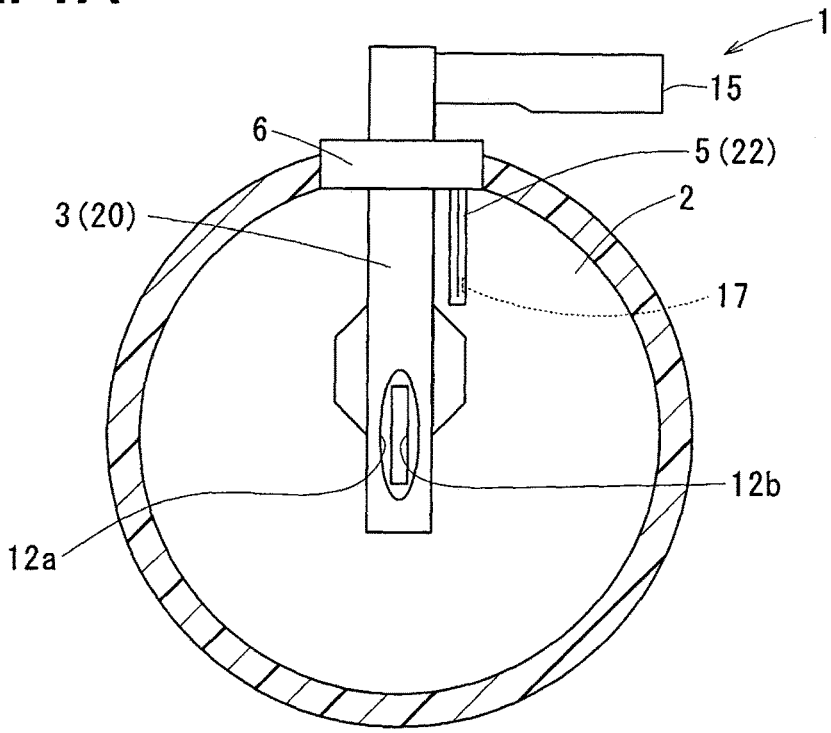
FIG. 1A is a diagram illustrating an entire configuration of a flow rate measuring device viewed from an upstream side in a flow direction of an intake air.

As follows, a plurality of embodiments of the present disclosure will be described in detail. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments Referring to FIGS. 1 and 2, a flow rate measuring device 1 will be described below.

The flow rate measuring device 1 is disposed in an intake passage 2 of an internal combustion engine for a vehicle to detect a flow rate and a humidity of an intake air flowing through the intake passage 2.

Hereinafter, a flow direction of the intake air in the intake passage 2 may be referred to as a "direction F".

The flow rate measuring device 1 includes a flow rate detecting body 3, a humidity detecting body 5, and a base 6, which will be described later.

The flow rate detecting body 3 holds a flow rate chip 10. The flow rate detecting body 3 protrudes inside of the intake passage 2, through which an intake air to be taken in the internal combustion engine, to detect a flow rate of the intake air.

The flow rate detecting body 3 is formed of rein material and defines a passage therein.

A bypass passage 12 and a sub bypass passage 13 are formed as the passage defined in the flow rate detecting body 3, for example.

The bypass passage 12 is a passage through which a portion of the intake air from the intake passage 2 flows. The bypass passage 12 is formed to extend along the direction F. An inlet 12a is defined at an upstream side of the bypass passage 12, and an outlet 12b is defined at a downstream side of the bypass passage 12.

An outlet throttle 12c is disposed at a downstream side of the bypass passage 12. The outlet throttle 12c narrows the bypass passage 12 to regulate a flow amount of the intake air in the bypass passage 12.

The sub bypass passage 13 defines an inlet opening 13a and an outlet opening 13b. A portion of the intake air flowing through the bypass passage 12 regulated by the outlet throttle 12c flows into the inlet opening 13a. The intake air that passed through the sub bypass passage 13 is returned to the intake passage 2 through the outlet opening 13b. The intake air into the inlet opening 13a is guided to the outlet opening 13b after circulates inside the flow rate detecting body 3.

The flow rate chip 10 includes, e.g., a flow rate detecting element 10a sensitive to a flow rate of the intake air. The flow rate detecting element 10a is a heat transfer type detector that measures a flow rate of the intake air flowing through the sub bypass passage 13 through heat transfer. The flow rate detecting element 10a includes a heat resistant element and a resistance temperature element that are disposed on a surface of the flow rate detecting element 10a. The flow rate chip 10 outputs signals according to a flow rate of the intake air to ECU (not shown) through a connecting terminal in a connector 15.

The connector 15 is integrally formed with the base 6.

The humidity detecting body 5 holds a humidity detecting chip 17. The humidity detecting body 5 protrudes inside of the intake passage 2 at a position away from the flow rate detecting body 3 to detect a humidity of the intake air.

The humidity detecting body 5 extends a direction (hereinafter, referred to as a "longitudinal direction") that is perpendicular to the direction F.

The humidity chip 17 includes, e.g., a humidity detecting element 17a sensitive to a humidity of the intake air. The humidity detecting element 17a is disposed on a surface of the humidity chip 17, and the humidity chip 17 is held by the humidity detecting body 5 such that the humidity detecting element 17a is exposed inside the intake passage 2.

Specifically, the humidity chip 17 is held at a side of the humidity detecting body 5 such that a surface of the humidity detecting element 17a extends in a direction parallel to the longitudinal direction and the direction F.

The humidity detecting element 17a is a capacitive sensing type detector that varies its capacitance according to a humidity. The humidity detecting element 17a includes a polymer film on a surface thereof that varies its capacitance according to a humidity. The humidity chip 17 outputs signals according to a humidity of the intake air to the ECU through a connecting terminal of the connector 15.

The humidity detecting body 5 is formed by embedding the humidity chip 17 held by a holding substrate 19, a lead terminal (not shown) electrically connected to the humidity chip 17, and so on, into a resin material.

The holding substrate 19 is formed of a silicon substrate. By fixing the humidity chip 17 having less strength to the holding substrate 19, the humidity chip 17 can be easily handled.

The base 6 is connected to both the flow rate detecting body 3 and the humidity detecting body 5, and serves as a root portion of the flow rate detecting body 3 and the humidity detecting body 5. The base 6 is formed by inserting a molten resin into a mold where ends of both the flow rate detecting body 3 and the humidity detecting body 5 are housed.

The flow rate detecting body 3 includes a first exposed portion 20 that is a protruding portion from the base 6 and is exposed inside the intake passage 2. The humidity detecting body 5 includes a second exposed portion 22 that is a protruding portion from the base 6 and is exposed inside of the intake passage 2.

An attachment hole is defined in the intake passage 2 at a position where the flow rate measuring device 1 is mounted. The attachment hole is open through the intake passage 2. The flow rate measuring device 1 is fixed to the intake passage 2 by fitting the base 6 of the flow rate measuring device 1 into the attachment hole.

Here, a vertical cross-section and a parallel cross-section of the humidity detecting body 5 are defined as following.

The vertical cross-section is a cross-section that is perpendicular to the longitudinal direction. The parallel cross-section is a cross-section that is parallel to the longitudinal direction and the direction F.

A length of the second exposed portion 22 of the humidity detecting body 5 along a flow direction of the intake air is defined as a referential length Lh.

Figure 2A:
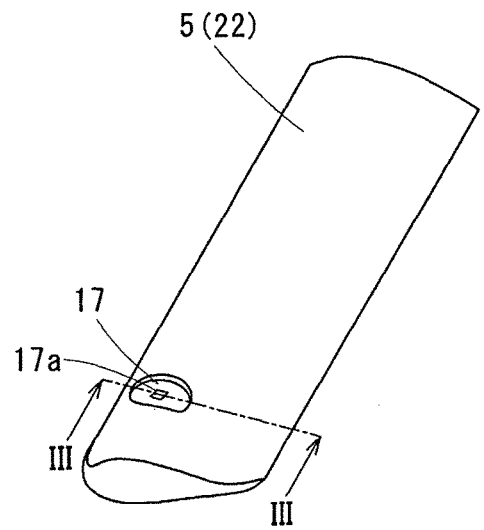
FIG. 2A is a perspective view of a humidity detecting body.
Figure 2B:
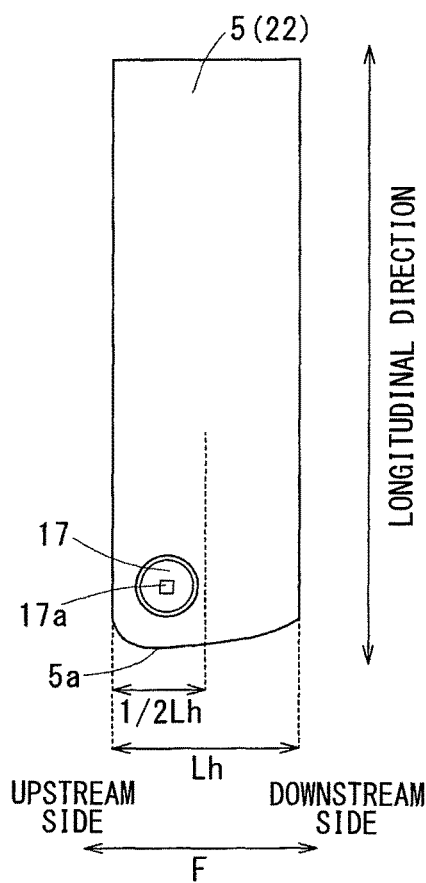
FIG. 2B is a side view of the humidity detecting body viewed from a direction perpendicular to a longitudinal direction and the flow direction of the intake air.
Figure 3:
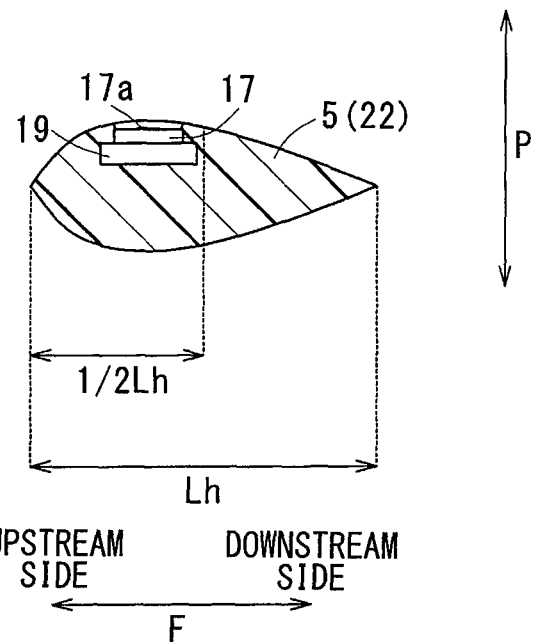
FIG. 3 is a vertical cross-sectional view of the humidity detecting body taken along III-III line in FIG. 2A.

The humidity detecting element 17a exists within a range from an upstream end of the second exposed portion 22 to a position of half the referential length (i.e., ½*Lh), as shown in FIG. 2B and FIG. 3. The humidity detecting element 17a is preferably arranged close to the upstream end of the second exposed portion 22 as much as possible.

A length of the first exposed portion 20 of the flow rate detecting body 3 along the flow direction of the intake air is defined as a supplemental referential length Lf.

Figure 1B:
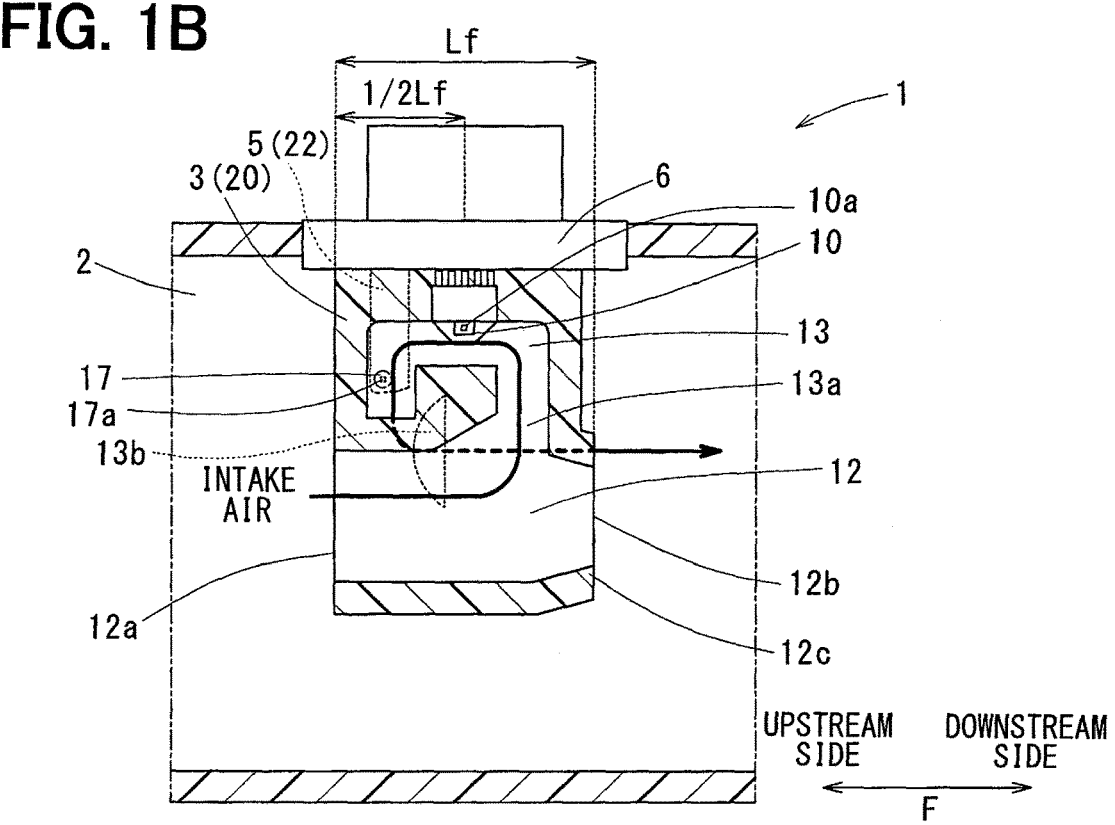
FIG. 1B is a cross-sectional view of the flow rate measuring device along the flow direction of the intake air.

The humidity detecting element 17a exists upstream of a position of half the supplemental referential length Lf (i.e., ½*Lf), as shown in FIG. 1B. In other words, The humidity detecting element 17a exists between the upstream end of the first exposed portion 20 and the position of half the supplemental referential length Lf. The humidity detecting element 17a is preferably arranged close to the upstream end of the first exposed portion 20 as much as possible.

The vertical cross-section of the humidity detecting body 5 exhibits a streamlined shape along the flow direction of the intake air (see FIG. 3).

Specifically, the vertical cross-section of the humidity detecting body 5 has a width along a direction P perpendicular to the direction F gradually increases from the upstream side to a middle position and then gradually decreases from the middle position to the downstream side.

The humidity detecting element 17a exists at a position where the width along the direction P in the vertical cross-section has a maximum value (see FIG. 3).

Figure 2C:
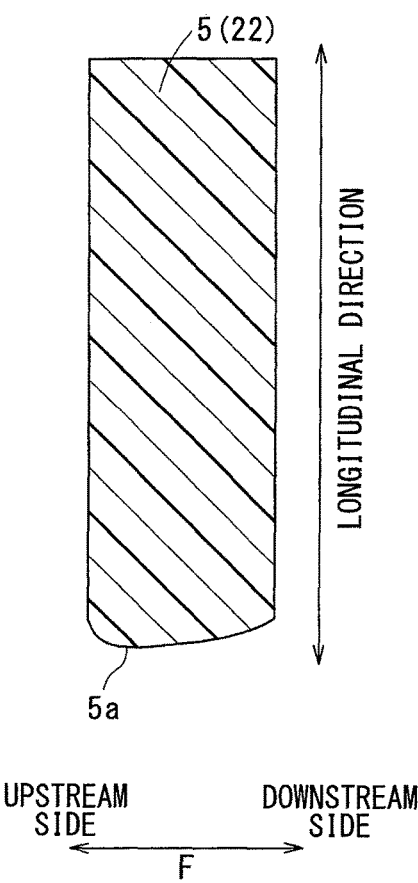
FIG. 2C is a parallel cross-sectional view of the humidity detecting body.

Furthermore, in the parallel cross-section of the humidity detecting body 5, a protruding end 5a of the humidity detecting body 5 exhibits a streamlined shape along the flow direction of the intake air (see FIG. 2C). The protruding end 5a is a tip end of the humidity detecting body 5 in the longitudinal direction.

In the flow rate measuring device 1 according to the present embodiment, the humidity detecting element 17a exists within the range from the upstream end of the second exposed portion 22 of the humidity detecting body 5 to the position of half the referential length Lh.

Therefore, the humidity detecting element 17a is positioned upstream of the center point of the humidity detecting body 5 in the flow direction of the intake air.

Hence, a heat amount transferred to the intake air reaching the humidity detecting element 17a from the humidity detecting body 5 becomes small as compared to a case where the humidity detecting element 17a is positioned downstream of the center point of the humidity detecting body 5.

As a result, an increase in a temperature of the intake air when passing through the humidity detecting element 17a can be suppressed.

Accordingly, an increase in a temperature of the humidity detecting element 17a of the flow rate chip 17 can be suppressed in the flow rate measuring device 1 arranged in the intake passage 2.

According to the flow rate measuring device 1 of the present embodiment, the humidity detecting element 17a exists upstream of the position of half the supplemental referential length Lf in the first exposed portion 20.

Accordingly, the humidity detecting element 17a is positioned upstream of the center point of the flow rate detecting body 3 in the flow direction of the intake air.

As such, a heat amount transferred to the intake air reaching the humidity detecting element 17a from the flow rate detecting body 3 is small as compared to a case where the humidity detecting element 17a is positioned downstream of the center point of the flow rate detecting body 3.

As a result, an increase in a temperature of the intake air when passing through the humidity detecting element 17a can be suppressed.

Accordingly, an increase in a temperature of the humidity detecting element 17a of the flow rate chip 17 can be suppressed in the flow rate measuring device 1 arranged in the intake passage 2.

Modification to the Embodiment

Figure 4:
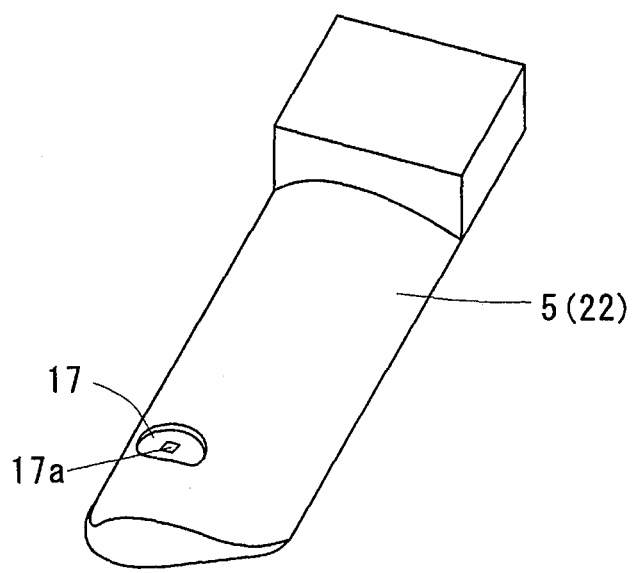
FIG. 4 is a perspective view of a humidity detecting body according to a modification to the embodiment.

In the above-described embodiment, the vertical cross-section of the humidity detecting body 5 has the same shape regardless of the position in the longitudinal direction where the vertical cross-section is taken. Alternatively, the vertical cross-section of the humidity detecting body 5 may have a different shape with the position where the vertical cross-section is taken. For example, the vertical cross-section taken at a position close to the base 6 may be larger than the vertical cross-section taken at a position away from the base 6, as shown in FIG. 4. With this structure, the strength in the humidity detecting body 5 can be increased.

What is claimed is:

1. A flow rate measuring device comprising:
   a flow rate detecting body that protrudes inside of an intake passage through which an intake air to be taken in an internal combustion engine flows, the flow rate detecting body detecting a flow rate of the intake air;
   a humidity detecting body that protrudes inside of the intake passage at a position away from the flow rate detecting body, the humidity detecting body detecting a humidity of the intake air; and
   a base that is connected to the flow rate detecting body and the humidity detecting body, the base serving as a root portion of the flow rate detecting body and the humidity detecting body, wherein
   the humidity detecting body holds a sensor chip that includes a humidity detecting element sensitive to the humidity of the intake air,
   the humidity detecting element is disposed on a surface of the sensor chip and the humidity detecting body holds the sensor chip such that the humidity detecting element is exposed inside of the intake passage,
   a length, along a flow direction of the intake air, of an exposed portion of the humidity detecting body that is exposed inside of the intake passage is defined as a referential length, and
   the humidity detecting element exists within a range from an upstream end of the exposed portion of the humidity detecting body to a position of half the referential length.

2. The flow rate measuring device according to claim 1, wherein
   a length, along the flow direction of the intake air, of an exposed portion of the flow rate detecting body that is exposed inside of the intake passage is defined as a supplemental referential length, and
   the humidity detecting element exists upstream of a position of half the supplemental referential length.

* * * * *